(12) United States Patent
Schenk et al.

(10) Patent No.: US 7,027,152 B2
(45) Date of Patent: Apr. 11, 2006

(54) SPECTROMETER

(75) Inventors: Harald Schenk, Dresden (DE);
Heinrich Grueger, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 10/918,286

(22) Filed: Aug. 13, 2004

(65) Prior Publication Data

US 2005/0057751 A1    Mar. 17, 2005

Related U.S. Application Data

(63) Continuation of application No. PCT/EP02/01510, filed on Feb. 13, 2002.

(51) Int. Cl.
*G01J 3/18*    (2006.01)

(52) U.S. Cl. ...................... 356/328; 356/334

(58) Field of Classification Search ............... 356/328, 356/334, 330
See application file for complete search history.

(56) References Cited

U.S. PATENT DOCUMENTS

| | | | |
|---|---|---|---|
| 4,469,441 A | | 9/1984 | Bernier et al. |
| 4,664,522 A | * | 5/1987 | LeFebre ............... 356/328 |
| 5,963,320 A | * | 10/1999 | Brooks et al. ........... 356/310 |

FOREIGN PATENT DOCUMENTS

| | | |
|---|---|---|
| DE | 1995579 | 5/2001 |
| GB | 2066 985 | 7/1981 |

* cited by examiner

*Primary Examiner*—Layla G. Lauchman
(74) *Attorney, Agent, or Firm*—Michael A. Glenn; Glenn Patent Group (57) ABSTRACT

A spectrometer is described which comprises a dispersive element for spectrally decomposing a light beam, whose spectral distribution is to be determined, into spectral components, as well as a suspension for supporting the dispersive element and for biasing the same into a resting position with a biasing force, when the dispersive element is in a deflected position. A control means controls a holding means to vary the deflected position, so that different spectral components become detectable for a detector of the spectrometer having a first and a second detector element. A combining means combines shots made by the detector at different positions of the dispersive element.

16 Claims, 3 Drawing Sheets

- Prior Art -

Fig. 5

- Prior Art -

SPECTROMETER

CROSS-REFERENCE TO RELATED APPLICATION

This application is a continuation of copending International Application No. PCT/EP2002/001510, filed Feb. 13, 2002, which designated the United States and was not published in English.

BACKGROUND OF THE INVENTION

1. Field of the Invention

The present invention relates generally to spectrometry, such as emission, absorption or transmission spectroscopy, and particularly to a spectrometer, which can be realized as microspectrometer.

2. Description of the Related Art

Figure 4:
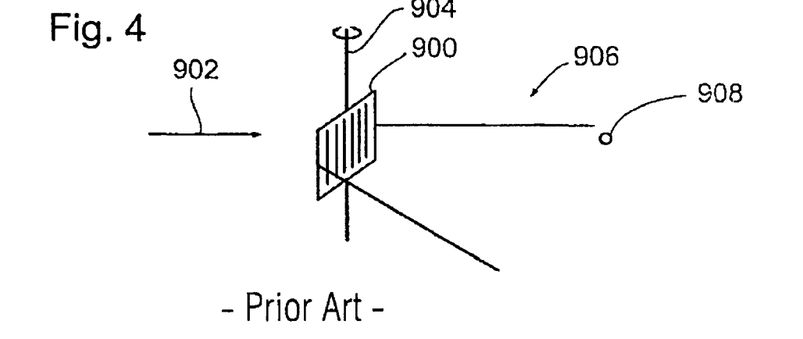
FIG. 4 is a schematic representation of an conventional spectrometer type.

With the spectrometer, it is possible to measure light in a certain spectral range in a wavelength-dependent way. Center piece of every spectrometer is a dispersive element, such as a grating or prism, which light enters, whose spectral distribution is to be determined, and which decomposes the incident light into its spectral components, and a corresponding detector for sensing one or several of the spectral components. FIG. 4 shows a conventional arrangement of a grating spectrometer. A moveable grating is illuminated by an entrance slit and a collimating element (not shown) with a light beam 902, whose spectral distribution is to be determined. The movable grating 900 is rotatably mounted, wherein the adjustment of the grating 900 is performed quasi-statically, typically via a step motor. The light 906 split into wavelengths—specifically, a spectral component of the same—is detected by detector element 908, while the grating 900 is moved into different positions. In that way, the light 906 split into wavelengths is sampled by the detector 908, wherein its measurement signals are shot correspondingly to determine the spectral distribution of the light beam 902.

For so-called low-cost applications, devices of the type of FIG. 4 are too expensive and too costly due to their expensive mechanical control of the quasi-static movement of the grating 900. Additionally, the type of device of FIG. 4 is sensitive against shock and temperature variations. With shock and vibration, the grating requires a long time to get back to a defined deflection position, and the step motor is in danger jump one increment without this being detected by the motor control. Additionally, the micromechanic manufacturability of step motors is limited with regard to miniaturization. It is a further disadvantage, that the light proofness of the housing (not shown) of these devices has to be ensured despite all required device feeding lines, for, for example, the mechanical drive of the grating 900 and the operation of the detector element 908. Particularly, the measurement length for determining the spectral distribution of the incident light 902 is too long.

Figure 1:
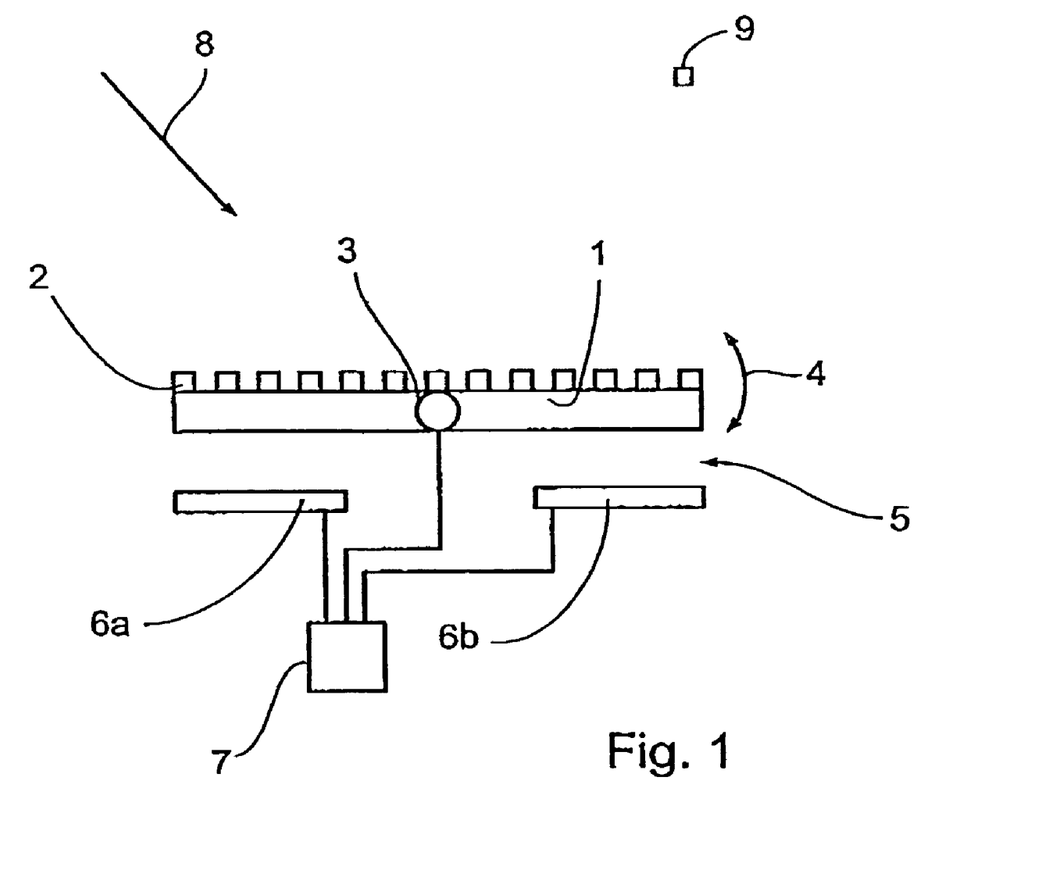
FIG. 1 is a schematic side view of a micromechanically produced phase or amplitude modulation lattice suspended at a torsion spring, which is deflected capacitively according to an embodiment of the present invention.
Figure 5:
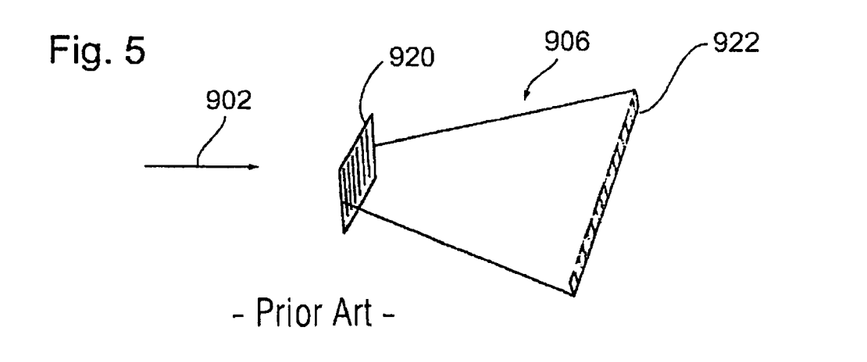
FIG. 5 is a schematic representation of a further conventional spectrometer type.

Apart from the conventional solutions of FIG. 4, miniature spectrometers in the form of PC plug in cards or in the form of smaller external housings with a corresponding computer interface have existed for several years. The basic setup of these miniature spectrometers is shown in FIG. 5. A grating 920, to which the light beam 902 enters, a photodiode line 922 as well as a required control logic (not shown) is disposed on a board (not shown). In these miniature spectrometers, the grating 920 is disposed fixed or pinned and is in an encapsulation (not shown), together with the photodiode line 922. An example for a miniature spectrometer of the type shown in FIG. 1 is, for example, shown in DE 19836595A1.

Although the prices of such spectrometers with fixed grating are low, it is a disadvantage of these fixed grating systems, that the wavelength range detected by the photodiode line 922 as well as the spectral resolution are set during production and are thus invariable. One possibility to adapt wavelength range and spectral resolution to a particular application based on an existing supply of such fixed grating spectrometers, is merely the usage of several spectrometers in parallel in a master-slave operation, wherein several spectrometers of different resolution and different wavelength ranges, respectively, are coupled. Thereby, however, additional costs per slave module occur. Additionally, a flexible solution where the detectable wavelength range as well as the spectral resolution can be changed any time is also not obtained by this modular coupling of several modules.

One specific problem in the design of miniature spectrometers is that the available space is limited, whereby, on the one hand, the detectable detection range and, on the other hand, the obtainable resolution is limited. The detectable wavelength range depends on the fixed grating dimensions, particularly the grating distance and the distance of the grating from the detector element, the so-called base length. Apart from other amounts, such as the amount of an entrance or exit slit and the utilized refractive order, the resolution of the spectrometer depends on the base length, the grating number and the distance of the photodiode elements of the photodiode line and the exactness of the grating positioning, respectively. If, for example, by using a photodiode line with fixed density and by considering maximum dimensions, a spectrometer of the type of FIG. 5 is designed for high resolution, this is performed at the cost of the detectable spectral range, and conversely, if the spectrometer is designed for a large spectral range, a poorer resolution results.

Typical process spectrometers, which are formed in the form of two-line spectrometers with fixed grating and CCD or photodiode line, use line photo detectors with typically 1024 to maximum 2048 lines. For separating two spectral lines, theoretically, at least three line elements are required, wherein, however, practically about 5 to 7 lines are required for separating spectral lines. Assuming the usage of an optical fiber as a slit and the base length of a PC card spectrometer, a resolution in the range of 0.2 nm in a spectral detection range of 60 nm results with these line spectrometers. This resolution is sufficient for many applications, but the resulting spectral detection range is too small for many applications, since, for evaluation, usually two or more spectral lines of the spectrum to be examined have to be taken into consideration and thus have to be within the detection range. Alternatively, if the spectrometer is designed for a lower resolution, a larger range of, for example, 600 nm can be achieved, such that it would be sufficient for the spectroscopy across the visible spectral range, i.e. for the wavelengths of 400 nm to 800 nm, but the resulting resolution of 2 nm provides only a very poor quality.

Accordingly, there is a need in the art for a spectrometer that can be produced micromechanically, and that ensures a sufficient resolution and at the same time a sufficient spectral and detection range despite miniaturization. Compared to the conventional spectrometer types of FIG. 4, the measuring should further be less expensive, more flexible and less long. Additionally, a sufficient protection from vibration and shock should be ensured.

SUMMARY OF THE INVENTION

It is the object of the present invention to provide a spectrometer and a method for determining the spectral distribution of a light beam, which provides a sufficient resolution and a sufficient section range and is thereby less susceptible to vibration and shock.

In accordance with a first aspect, the present invention provides a spectrometer, having a dispersive element for spectrally decomposing a light beam, whose spectral distribution is to be determined, into spectral components; a suspension for supporting the dispersive element and for biasing the same into a resting position with a biasing force, when the dispersive element is in a deflected position; a means for holding the dispersive element at the deflectable position, wherein the means for holding is formed to apply a holding force to the dispersive element, so that the deflected position of the dispersive element is a position where an equilibrium of powers between the holding force and the biasing force is established; and a detector, wherein the detector has a first detector element and a second detector element, the spectrometer further having a control unit, which is coupled to the means for moving the dispersive element, for controlling the detector such that the first detector element detects a first spectral component when the dispersive element is in a first position, and a second spectral component when the dispersive element is in a second position, and that the second detector element detects a third spectral component when the dispersive element is in a first position, and a fourth spectral component when the dispersive element is in the second position, wherein the first and third detected spectral components form a first shot and the second and fourth detected spectral components forms a second shot; and a means for combining the first and second shots to determine the spectral of the light beam.

In accordance with a second aspect, the present invention provides a method for determining the spectral distribution of a light beam, having spectrally decomposing the light beam in spectral components by a dispersive element; supporting the dispersive element and biasing the same into a resting position with a biasing force by a suspension, when the dispersive element is in a deflected position; holding the dispersive element at the deflected position by applying a holding force to the dispersive element, so that the deflected position of the dispersive element is a position where an equilibrium of powers is established between the holding power and the biasing power; detecting the spectrally split light beam via a detector, wherein the detector has a first detector element and a second detector element, wherein the detecting takes place such that the first detector element detects a first spectral component when the dispersive element is in a first position, and a second spectral component when the dispersive element is in a second position, and that the second detector element detects a third spectral component when the dispersive element is in a first position, and a fourth spectral component when the dispersive element is in the second position, wherein the first and third detected spectral components form a first shot and the second and fourth detected spectral components a second shot; and combining the first and second shots to determine the spectral distribution of the light beam.

The invention is based on the knowledge that the quasi-static deflection of the dispersive element can also be achieved in a miniaturization, and that a higher degree of insusceptibility against vibration and shock can be obtained, when a suspension is used for the dispersive element, which biases the same into a resting position, as well as for deflecting a means for holding the dispersive element into a deflected position, such that there will be an equilibrium of powers between the holding power and the biasing power. In that way, after shock or vibration, the dispersive element always returns to the position defined by the holding power. With a suitable attenuation, additionally, the time required for the return of the dispersive element into the defined deflected position can be kept low.

An inventive spectrometer comprises a dispersive element for spectrally decomposing a light beam, whose spectral distribution is to be determined, into spectral components, as well as a suspension for supporting the dispersive element and for biasing the same into a resting position with a biasing force, when the dispersive element is in an deflected position. According to one embodiment, the dispersive element is a micromechanically produced mirror with a phase or amplitude modulation grating structure at the mirror surface, which is suspended from two opposing sides along a central axis at two ridges as torsion springs. Further, the spectrometer comprises means for holding the dispersive element in the deflected position, wherein this means for holding is formed to apply a holding power to the dispersive element, so that there will be an equilibrium of powers between the holding power and the biasing power at the deflected position of the dispersive element. According to one embodiment of the present invention, the holding means has, for example, an capacitive effect and consists of a fixed electrode and an area of the dispersive element serving as counter electrode. A control means can control the holding means to vary the deflected position, so that different spectral components become detectable for a detector of the spectrometer.

In order to obtain a spectrometer with limited available physical dimensions, which has significantly improved properties, the mobility of the dispersive element is combined with the usage of a detector line of a conventional miniature spectrometer of FIG. 5 consisting of several detector elements according to embodiments of the present invention, wherein for determining the spectral distribution of a light beam several shots are combined. Disadvantages, which inevitably occur in a miniaturization, such as the smaller geometric dimensions, particularly with regard to the base length of the spectrometer and the length of the detector line, and the limitations occurring thereby with regard to resolution and spectral detection range, respectively, can be overcome by combining several shots of the different positions of the dispersive element.

According to an embodiment of the present invention, a spectrometer comprises a detector line of several detector elements. Every detector element comprises a different spectral component of the incident light beam at a time. The spectral components detected by the detector elements of the detector line at one time form together one shot and exposure, respectively, which extends across a wavelength range, which depends on the position of the dispersive element during the exposure and the shot, respectively. For every determination of the spectral distribution of the light beam, two shots are taken, which are controlled by the controller unit, wherein the dispersive element is moved from a first to a second position between the two shots. In order to improve the resolution, the control of the exposure times of the detector line is performed such that the spectral components of the first shot are interleaved with the ones of the second shot, so that the first and second shot comprise essentially the same spectral range. In this case, the combination of first and second shots corresponds to a determination of the spectral distribution, which could have, with simple exposure, only been obtained by a detector line with a higher detector element density.

To obtain a larger spectral detection range, the control unit controls the detector line such that the dispersive element has moved so far between the first and second shot that the spectral components of the first shot are outside the ranges lying between the spectral components of the second shot, and that the spectral components of the first shot and the spectral components of the second shot are linked to one another. Consequently, the combination of the two shots corresponds to a determination of a spectral distribution as it would have otherwise been obtained via a single exposure by, for example, a larger detector line.

BRIEF DESCRIPTION OF THE DRAWINGS

These and other objects; and features of the present invention will become clear from the following description taken in conjunction with the accompanying drawings, in which.

DESCRIPTION OF THE PREFERRED EMBODIMENTS

Before specific embodiments for spectrometers of the present invention will be described with reference to FIGS. 2 to 5, reference will be made below to the embodiment of FIG. 1 for a suspension of the dispersive element as well as its deflection, to obtain a quasi-static deflection of the same.

FIG. 1 shows a grating, which is quasi-statically deflectable by electrostatic forces. The grating is produced micromechanically and consists of a rectangular plate 1, which has on its main side 2 a structure 2 for a phase or amplitude modulation, which thus serves as reflection grating. The plate 2 is supported on center along a central axis across two ridges 3 on two opposing sides, so that the plate 1 is pivotable around the axis defined by the torsion springs 3, as it is shown by the double-headed arrow 4. Thereby, the ridges 3 serve as torsion spring, which applies a bias force in direction of the resting position on plate 1 depending on the deflection of the plate 1 from the resting position, as illustrated in FIG. 1, and being, for example, proportional to the same. Two electrodes 6a and 6b are disposed across a slit 5 opposite to the unstructured main side of plate 1, one each on a different one of the halves defined by the axis through the torsion springs 3. The electrodes 6a and 6b act capacitively together with the plate 1, which is therefore made either of a conductive material or has a conductive layer, for example, on the lower side opposing the electrodes 6a and 6b.

After the structure of a quasi-statically deflecting grating according to an embodiment of the present invention has been described above, the mode of operation will be described below. The plate 1 and its conductive range, respectively, is held on a defined potential over the torsion spring 3, which is therefore either made itself of conductive material or has a partial conductive coating, such as on the whole lower side or only at the locations above the electrodes 6a and 6b. If a voltage is applied between the plate 1 and the electrode 6a, the plate 1 tilts and pivots, respectively, (from the perspective of the viewer) counterclockwise towards the electrode 6a, so far until the electrostatic moment and the mechanical moment caused by the torsion of the ridges 3 balance each other out. In the same way, by applying a voltage between plate 1 and electrode 6b, a deflection of the plate 1 is achieved clockwise towards the electrode 6b. If the voltage is turned off, the plate 1 will return to its resting position by the mechanical restoring force of the torsion springs 3 depending on the attenuation by the ridges 3. The attenuation should be suitable to avoid an overshoot of the plate on the one hand and a too slow return to the resting position on the other hand. With vibration or shock, the plate 1 will always lead back to the deflected position, which is defined, on the one hand, by the potential difference between the electrode 6a and the plate 1 and the electrode 6b and the plate 1, respectively, and, on the other hand, the restoring force of the torsion springs 6a and 6b and the spring constant defined by the same, respectively. An excessive vibration of the plate 1 can be obtained by appropriate setting of the attenuation. Regarding attenuation and spring constant, it can be advantageous to make an appropriate trade off when setting attenuation and spring constant.

A control means 7, which is conductively connected to the electrodes 6a and 6b as well as the plate 1, controls the potential difference between the plate 1 and the electrode 6a and the plate 1 and the electrode 6b, respectively, depending on the fact whether the plate 1 is to be tilted clockwise or counterclockwise. The control 1 is illustrated simplified in FIG. 1 for clarity reasons, and is performed, for example, by controlling a voltage source to set its output voltage and selecting the electrode to which the output voltage is applied, wherein the plate and the respectively not selected electrode are connected to ground. By varying the potential difference and thus the electrostatic moment, the control means 7 sets different deflection positions of the plate 1. Depending on the set deflection of the plate 1 and thus the grating 2, a detector 9, which is disposed at an appropriate distance from the structured surface 2 of the plate 1 away detects a difference spectral component of the light beam 8 incident on the grating 2.

It should be noted that as an alternative to the embodiment of FIG. 1, the grating could further be biased into a resting position in a different way. The plate 1 could for example be cantilevered to be capacitively attracted by an electrode and thus be deflectable into one direction and, wherein an equilibrium between electrostatic moment and bending moment is established. Further, instead of the electrostatic deflection described in FIG. 1, an inductive or piezoelectric deflection could be used.

As has already been described, the wavelength of the spectral component detected by the detector 9 depends on the position of the plate 1. To correlate the measurement values detected by the detector with the currently detected wavelengths, an additional means (not shown) can be provided, which detects the deflection of the plate 1 capacitively, piezoresistively, inductively or optically at the detection time of the detector 9. These measurement values could then be used both for an association to the spectral sample values of the detector 9 as well as for feedback to the control means 7. Alternatively, the characteristic curve of the system of plate and torsion spring, i.e. the connection between potential difference and deflection, is sensed in advance and used by the control means 7 for determining the deflection angle at a given voltage.

Figure 2:
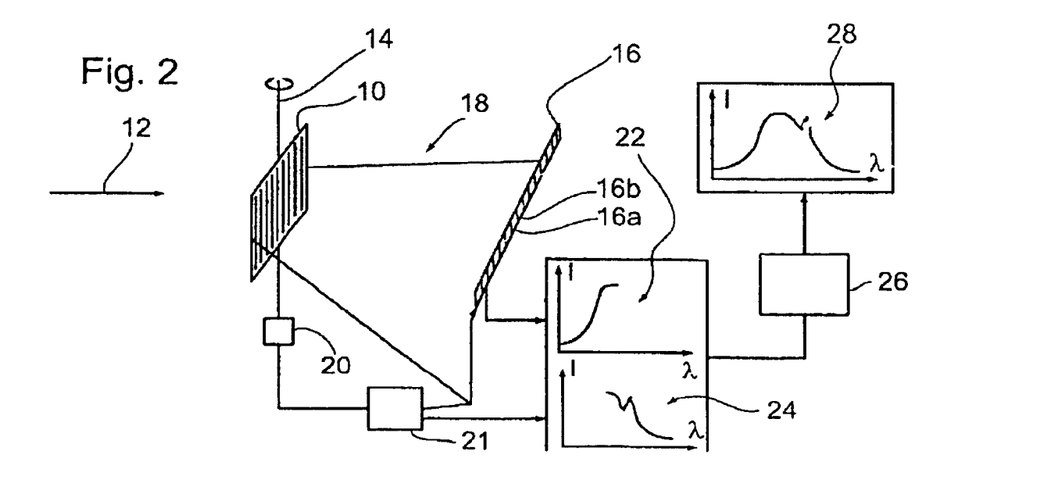
FIG. 2 is a schematic representation of a spectrometer set-up according to an embodiment of the present invention.

With reference to FIG. 2, first, a strongly simplified embodiment of the present invention will be described, where a detector line is used as detector, and where additionally a combination of two exposures if used.

The spectrometer of FIG. 2 comprises a moveable grating 10, on which a light beam 1 enters, which, spectral distribution is to be determined. The moveable grating 10, is rotatably mounted around an axis 14, as it is, for example, shown in FIG. 1. A detector line 16 of several detector elements 16a, 16b, two of which are merely provided with reference numbers due to clarity, is disposed to receive the light 18 split into its spectral components by the movable grating 10. For moving the movable grating 10, an appropriate drive 20 is provided, which is coupled to the movable grating 10 for driving via an inductive, capacitive or mechanical coupling. A control unit 21 is coupled to the drive on the one and the detector on the other side, which controls the exposure times when the detector takes shots relative to the movement of the grating 10. Therefore, the drive 20 detects (via a known connection between drive and deflection or via a dedicated detection means, as has been described with reference to FIG. 1), the current position of the grating 10 and outputs a signal to the control unit 21, which indicates the current position. The control unit 21 determines the exposure times, when the detector line 16 is to take shots and sends trigger signals to the detector line 16 for that.

Every detector element 16a, 16b detects a spectral component at a given time, which corresponds to a wavelength, which depends on the current position of the grating 10, or more exactly an intensity, which corresponds to the spectral component. Consequently, all detector elements 16a, 16b detect together at any time a sampled wavelength range of the spectrum of the light beam 12.

According to the invention, first, a shot is taken by the detector 16 for determining the spectral distribution of the light beam 12. For this shot, every detector element 16a and 16b detects a different spectral component of the light 18 split into its spectral components. The detector line 16 outputs the result of the first shot, wherein the result is schematically shown at 22 as graph, where the x axis corresponds to the wavelength λ and the y axis corresponds to the intensity I, and where an exemplary spectral intensity distribution is assumed. After the first shot, the drive 20 moves the movable grating 10 to a different position. The detector line 16 takes a second shot, wherein every detector element 16a and 16b detects a spectral component of the light 18 different to the case of the first shot. The result of the second shot and the exposure, respectively, is schematically shown in a graph 24, wherein again the x-axis corresponds to the wavelength λ and the y axis to the intensity I. As can be seen, it has been assumed in the example of FIG. 5 that the movable grating 109 has been moved so far between the first and the second shot that the wavelength range of the second shot is adjacent to the one of the first shot. Thereby, the length of the detector line 16 is virtually extended.

The two shots 22 and 24 are passed on to a combination means 26, which is connected both to the detector line 16 to obtain the intensity values of every detector element for every exposure from the same, and to the drive 20 control unit 21, to obtain, from one of the two, information about the position of the grating 10 to the exposure times or a wavelength scale associated with the intensity values, and which provides a result 28 based on the shots 22 and 24, which corresponds to the determination of the spectral distribution of the light beam 12 and is illustrated schematically as graph in FIG. 2, where again the x axis corresponds to the wavelength and the y axis to the intensity I. As can be seen, the detection range of the result 28 is about twice as big as the one of the individual shots 22 and 24. In the simplest case, the combination means 26 generates the result 28 merely by joining together the data of the first shot 22 and the data of the second shot 24. The data format consists, for example, of line up of pairs of one intensity value and the associated wavelength value, respectively. The wavelength values to every intensity value and the wavelength scale, respectively, are derived from information about the positions of the grating 10 at the times of the shots, wherein the derivation is either performed in the control unit 21 or the combination means 26 itself.

For many fields of application, however, it is required that the result 28 exists in a form where the spectral intensity values are provided at equidistant shot wavelengths. For that case, it can be advantageous when the combination means 26 first interpolates and samples again the data obtained by simple joining of the first and second shots 22 and 24 to obtain the spectral determination.

While in FIG. 2 an embodiment has been described where two shots have been used to enlarge the detection range, further, two shots can be combined to increase the resolution. In that case, the control unit controls the exposure times when the detector line 16 is to take shots, such that the difference between the positions is only small, so that the wavelength ranges comprised by the two shots are essentially the same, but that the wavelength, which is detected by a specific detector element 16a and 16b, respectively, in the second shot, differs from the one that the same element has detected during the first shot, for example, by about half of the wavelength distance of two adjacent detector elements. In this case, the combined result 28 would only have a detection range of a single shot, but an about twice as high resolution.

With regard to the movable grating, it should be noted that the same, as described with reference to FIG. 1, can for example be a micromechanically produced mirror with a microstructure as grating, which is supported at two opposing side centers along the axis 14. In a simple implementation, stops can be provided for the movable grating 10, which define two end positions for the grating 10, where the shots for a spectral determination are taken. The end positions and stops, respectively, can be designed such that a resolution doubling or an increased shot range is obtained.

It should be noted that despite the fact that in FIG. 2 a grating 10 has been used as dispersive element in transmission, the dispersive element could also be a mirror with a grating structure, i.e. a grating used in reflection, or a prism-shaped subject. Further, it should be noted that instead of the quasi-static movement, as it has been described with reference to FIG. 1, the dispersive element could further be vibrated and particularly be resonantly vibrated, by performing the variation of the deflected position through the control unit correspondingly fast with a vibration frequency. In the case of a miniaturization, a vibration frequency close the resonance frequency enables high deflections due to the resonance amplification with acceptable energy effort and ensures also that the spectrometer is insensitive against shock and vibration and requires only a minimal or no calibration effort.

Figure 3:
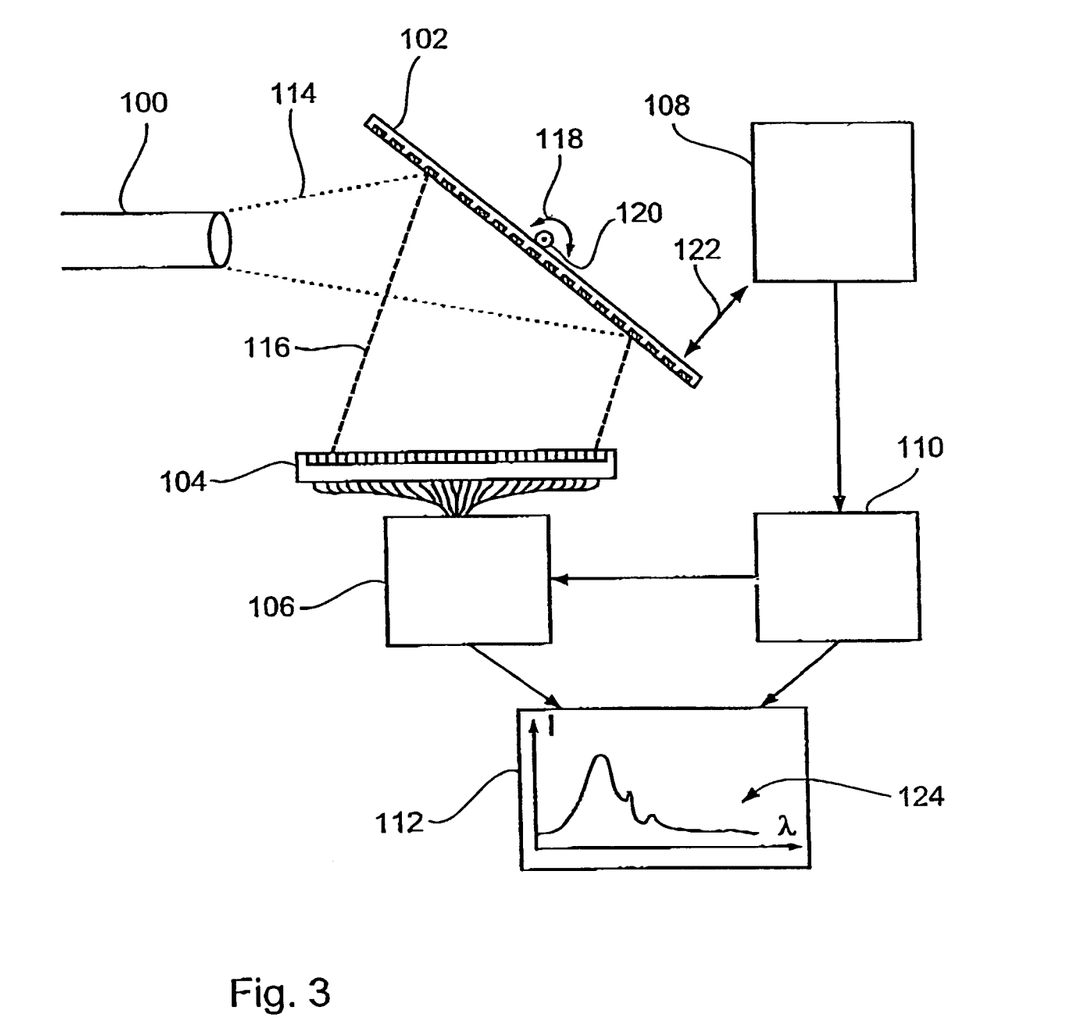
FIG. 3 is a specific realization of a spectrometer having a mode of operation according to the present invention.

With reference to FIG. 3, in the following, a specific realization of a spectrometer according to an embodiment of the present invention will be described, which has a quasi-statically operated grating as well as a photodiode line, and thus combines the advantages of a moveable dispersive element with the ones of a detector line. Particularly, the spectrometer of FIG. 3 can be used as process spectrometer.

The spectrometer of FIG. 3 consists of an optical fiber 100, a moveably or vibratably suspended gate 102, a detector line 104, such as photodiode or CCD line, which consists of a plurality of detector elements, which are numbered, an evaluation circuit 106, a grating drive 108, a control means 110 and a calculating unit 112. The control means is connected to the detector line 104 via the evaluation circuit 106, to supply a signal to the same for triggering the exposure and shutter signals, respectively, with the grating drive 108 to obtain information about the current position of the grating 110 from the same, and to the calculating unit 112 to supply information to the same, which are required for deriving a wavelength scale for the intensity values detected by detector line 104 or indicate this wavelength scale itself. The calculating unit 112 is also connected to the detector line 104 via the evaluation circuit 106, to obtain the detected wavelength-dependent intensity values from the same.

At the same time, the optical fiber 100 serves as entrance slit and is suitably disposed to launch a light, whose spectral distribution is to be determined, into the spectrometer such that it impinges on the vibrating grating 102, as it is indicated by the dotted lines 114. The optical fiber 100 is, for example, a cross section of 50 to 200 μm. The light 114 impinging on the grating 102 is split into its spectral components by the grating 102, and impinges, as it is illustrated by the broken lines 116, on the detector line 104. Every detector element of the detector line 104 outputs the detected intensity to the evaluation circuit 106, which passes these intensities on to the calculating unit 112 by indicating the respective detector element number of the respective detector element.

The grating drive circuit 108 effects a variation of the position of the grating 102 around an axis 120. The drive by the drive circuit 108 is performed by a mechanic, inductive or capacitive or other suitable coupling 122, as it is described with reference to FIG. 1. The drive circuit 108, which varies the positions of the grating 102, determines also the current position of the grating 102 (either by detection or by utilizing a known connection between deflection of the mirror 102 and the height of the drive) and outputs this information to the control unit 110.

As has already been described with reference to FIG. 2, the current position of the grating 102 defines a wavelength for every detector element, which is detectable for this detector element. Accordingly, every position is associated with a wavelength range, within which the spectrally split light 116 is sampled by the detector line, or a position of a central wavelength along an extension direction of the detector line. The detector line is disposed slanted and preferably horizontal to a plane which runs parallel to the axis 102 and encloses an angle with the mirror surface of the grating 102 in the resting position of the same, which is equal to the angle of incidence of the light beam 114.

The control means 110 monitors information about the current position of the grating 102 and outputs triggering impulses to the evaluation circuit 106 at the times when an exposure and shot, respectively, is to be performed by the photodiode line 104, which again passes the same on to the photodiode line 104 to cause the detector elements to take the shot of the light 116 split in a wavelength-dependent way.

Additionally, the control unit 110 calculates for every triggering impulse or every position of the grating 102 at the time of the triggering impulse the wavelength range, which is associated with the position of the grating 102 at this exposure time and indicates, which wavelength range is sampled by the detector elements of the detector line 104 at the exposure time, or another equivalent indication, such as the position of the central wavelength at the time of exposure in units of the detector element number, and supplies this information to the calculating unit 112, which based on this information associates a wavelength with every intensity and every associated photodiode number, respectively, and thereby calibrates the wavelength scale. The calculating unit 112 outputs the spectral distribution of the light 114 as output signal, as it is illustrated schematically by a graph 124, where the x axis corresponds to the wavelength λ and the y axis the intensity I, and wherein an exemplary spectral intensity distribution is illustrated schematically. Thus, the output signal of the calculating unit 112 corresponds a representation of the measured intensity signals against the calculated wavelength scale, which again corresponds to the measured optical spectrum of the incident light 114.

The spectrometer of FIG. 3 can be operated in different modes of operation. In a first mode of operation, the control unit 110 determines the exposure and sample times, respectively, such that the same are always performed at a specific position of the grating 102 and a specific deflection of the same, respectively. Thus, the control unit controls the shot and shutter function, respectively, of the detector line 104. Consequently, every shot of the detector line 104, which is output to the calculating unit 112 via the evaluation circuit 106, corresponds to the same wavelength range, which is associated with the specific position and deflection, respectively, of the grating 102. In this mode of operation, the result output by the calculating unit 112 corresponds to a single shot by the detector line 104 and comprises as many shots as detector elements are comprised in the detector line 104, and is defined by a resolution and a wavelength range, as they are determined by the length of the detector line 104, the distance of the detector elements of the detector line 104, the grating number of the grating 102 as well as the positional relation of the grating 102 to the detector line 104. By varying the deflection of the grating 102, the wavelength scale and the wavelength range of the spectral distribution, respectively, which is output by the calculating unit 112, can be varied for example manually via a rotary switch or in a programmable way, without changing the resolution of the spectrum output by the calculating unit 112.

In a further mode of operation, the control unit 110 effects several shots and exposures, respectively, by the detector line 104, which are combined by the calculating unit 112 to determine the spectral distribution of the light 114. The control unit. 110 outputs the triggering impulses, for example, each time to the control circuit 106 when the grating 102 has taken up a new position. In that way, several shots of the spectral distribution of the light 114 to different positions of the grating 102 result, wherein each shot consists of so many shots as detector elements are present. The control unit 110 selects, for example, two different positions for a shot for resolution doubling or for detection range extension, as has been described above. Consequently, two exposures and shots, respectively, are sampled by the photodiode line 104 and passed on the calculating unit 112. Both shots correspond to two different wavelength ranges and, when the positions are selected appropriately, not overlapping wavelength ranges, which complement one another. For every shot, the calculating unit 112 receives the corresponding wavelength range from the control unit 110, which the same calculates from the position at the exposure time. In that way, the determination of the spectral distribution of the light 114 can be combined of several shots with different and preferably adjacent wavelength ranges. However, it would also be possible that the control unit 110 selects the positions such that the wavelength ranges and wavelength scales, respectively, of these shots correspond essentially, wherein, however, the wavelengths corresponding to the individual detector elements during the different shots are interleaved, so that virtually the photodiode density of the photodiode line 104 is increased and thus the spectrum is detected with an increased resolution. Combinations of interleaved and not interleaved wavelength portions of the different shots to be combined are also possible.

The calculating unit 112 can output the different shots after the combination in different formats, such as every intensity values in pairs with its associated wavelength, and from every exposure of every detector element. Further, it is possible that the calculating unit 112 combines the different composite shots and then interpolates them and shots them again to obtain the spectral distribution in a form where the spectral intensity values are equidistant, as it is required for different applications for the further evaluation of the spectrum.

Thus, the spectrometer of FIG. 3 is based on a combination of the miniature spectrometer type described in the introduction of the description with fixed grating with the possibilities of the vibrating grating and vibrating mirror, respectively, which has here a grating structure, for example produced in CMOS-compatible microtechnique, instead of a simple mirror surface. The grating structures have, for example, 500 or more lines per millimeter. The drive is performed, for example, capacitively via interdigital electrodes. It is an advantage of the vibratably suspended mirror of the spectrometer of FIG. 3 that the micromechanic grating and may be additionally an associated control circuit can be realized inexpensively in a wafer matrix with CMOS-compatible technology. In that way, large numbers of gratings with holder and suspension, respectively, can be produced in an efficient way.

With reference to FIG. 3, it should be noted that the deflection could also be performed with a vibration, such as resonant, instead of quasi-statically. In this case, the grating drive 108 would effect a vibration 118 of the grating 102 around the axis 120, with, for example, essentially the resonance frequency of the grating 102. The drive via the drive circuit 108 would be performed via a similar mechanical, inductive or capacitive or another appropriate coupling 122. The drive circuit 108, which regulates the vibrating frequency of the grating 102, would detect the current position of the grating 102 and output this information to the control unit 110. A resonance and natural frequency $\omega_o$, respectively, is associated with the movable grating 102 for vibrations around the resting position around the axis 120, which depends on the spring constant of the suspension and holder, respectively, as well as the dimensions of the grating 102, and in the vicinity of which a resonance amplification occurs. The degree of resonance amplification depends on the quality factor of the vibration system of holder and suspended grating. The vibration control of the grating 102 would also offer advantages with regard to the combination mode, since it represents a simple way for repeatedly measuring combined measurements based on merely an appropriate control of the synchronization between vibration frequency of the grating 102 and a shot frequency of the detector line 104. In the case of the vibrating grating, the control unit 110 outputs the triggering pulses for example to the drive circuit 106 with a frequency which corresponds to an integer plurality n or a fully rational plurality n/m of the grating frequency. In that way, n and n×m shots, respectively, of the spectral distribution of the light 114 result at different positions of the grating 102 per vibration and after every (n*m)th vibration (n, m relatively prime) respectively, wherein every shot consists of so many shots as detector elements are present. The control unit defines the exposure times, for example, with a frequency, which corresponds to twice the vibration frequency of the grating 102. Consequently, only two exposures and shots, respectively, are sampled by the photodiode line 104 per vibration and passed on to the calculating unit 112. Both shots correspond to two different and, with appropriate phase position and deflection, non-overlapping wavelength ranges, which complement one another. For every shot, the calculating unit 112 receives the corresponding wavelength range, which the control unit 110 calculates from the position at the exposure time received by the drive unit 108. In that way, the determination of the spectral distribution of light 114 can be combined of several shots with different and preferably adjacent wavelength ranges. However, it would also be possible that the control unit 110 chooses the phase shift between exposure and vibration such that wavelength ranges and wavelength scales of these shots, respectively, essentially correspond, wherein, however, the wavelengths which correspond to the individual detector elements during the different shots are interleaved, so that virtually the photodiode density of the photodiode line 104 is increased and thus the spectrum is detected with an increased resolution. Combinations of interleaved and not interleaved wavelength portions of the different shots to be combined are also possible. A resonant vibration frequency would ensure an insensitivity against shock and vibration, a reduction of the calibration effort and a sufficient deflection due to the resonance amplification, despite rigidity of the semiconductor material in realizations in a semiconductor chip.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A spectrometer, comprising
   a dispersive element for spectrally decomposing a light beam, whose spectral distribution is to be determined, into spectral components;
   a suspension for supporting the dispersive element and for biasing the same into a resting position with a biasing force, when the dispersive element is in a deflected position;
   a means for holding the dispersive element at the deflectable position, wherein the means for holding is formed to apply a holding force to the dispersive element, so that the deflected position of the dispersive element is a position where an equilibrium of powers between the holding force and the biasing force is established; and a detector, wherein the detector has a first detector element and a second detector element, the spectrometer further comprising:

a control unit, which is coupled to the means for holding the dispersive element, for controlling the detector such that the first detector element detects a first spectral component when the dispersive element is in a first position, and a second spectral component when the dispersive element is in a second position, and that the second detector element detects a third spectral component when the dispersive element is in the first position, and a fourth spectral component when the dispersive element is in the second position, wherein the first and third detected spectral components form a first shot and the second and fourth detected spectral components forms a second shot; and a means for combining the first and second shots to determine the spectral of the light beam.

2. The spectrometer according to claim 1, further comprising:

a control means for controlling the means for holding to vary the deflected position so that different spectral components are detectable for the detector.

3. The spectrometer according to claim 1, further comprising:

a means for detecting the deflection of the dispersive element.

4. The spectrometer according to claim 1, wherein the means for holding the dispersive element is adapted at the deflected position to determine the holding force depending on a predetermined connection between an applied holding force and a deflection of the dispersive element.

5. The spectrometer according to claim 1, wherein the control unit is adapted to control the detector such that the spectral components of the first shot are outside the region lying between the spectral components of the second shot.

6. The spectrometer according to claim 5, wherein the control unit is adapted to control the detector such that spectral components of the first shot are adjacent to the spectral components of the second shot, so that the first and second shots form a closed spectral range.

7. The spectrometer according to claim 1, wherein the control unit is adapted to control the detector such that the spectral components of the first shot are interleaved with those of the second shot, so that the first and second shots extend essentially across the same spectral range.

8. The spectrometer according to claim 1, wherein a wavelength range is associated with every possible position of the dispersive element, and further comprising a means for associating a first wavelength to the first detected component and a third wavelength to the third detected component depending on the wavelength range associated with the first position of the dispersive element, and for associating a second wavelength to a second detected spectral component and a fourth wavelength to the fourth detected spectral component depending on the wavelength range associated with the second position of the dispersive element.

9. The spectrometer according to claim 1, wherein the dispersive element is a mirror with grating structure.

10. The spectrometer according to claim 1, wherein the dispersive element is moveable between the first and second positions, and the first and second positions each define one end position.

11. The spectrometer according to claim 1, wherein the detector is a photodiode line or a CCD line.

12. The spectrometer according to claim 2, wherein the control unit is adapted to vary the deflected position such that the dispersive element is vibrated with a vibration frequency.

13. The spectrometer according to claim 12, wherein the control unit comprises:

a means for synchronizing the moving means and the detector.

14. The spectrometer according to claim 12, wherein the control unit is adapted to control the detector such that the same makes the detection during a vibration at the times when the dispersive element is in a first and a second position.

15. The spectrometer according to claim 12, wherein the control unit comprises:

a means for driving the detector with a detection signal, which indicates when the detector is to perform a detection, with a frequency, which is equal to an integer or fully rational plurality of the vibration frequency.

16. A method for determining the spectral distribution of a light beam, comprising spectrally decomposing the light beam in spectral components by a dispersive element;

supporting the dispersive element and biasing the same into a resting position with a biasing force by a suspension, when the dispersive element is in a deflected position;

holding the dispersive element at the deflected position by applying a holding force to the dispersive element, so that the deflected position of the dispersive element is a position where an equilibrium of powers is established between the holding power and the biasing power;

detecting the spectrally split light beam via a detector, wherein the detector has a first detector element and a second detector element, wherein the detecting takes place such that the first detector element detects a first spectral component when the dispersive element is in a first position, and a second spectral component when the dispersive element is in a second position, and that the second detector element detects a third spectral component when the dispersive element is in the first position, and a fourth spectral component when the dispersive element is in the second position, wherein the first and third detected spectral components form a first shot and the second and fourth detected spectral components a second shot; and combining the first and second shots to determine the spectral distribution of the light beam.

* * * * *